US008597043B2

(12) United States Patent
Zhao

(10) Patent No.: US 8,597,043 B2
(45) Date of Patent: Dec. 3, 2013

(54) HIGH VOLTAGE CONNECTOR ASSEMBLY

(75) Inventor: Weiping Zhao, Superior Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 86 days.

(21) Appl. No.: 13/415,602

(22) Filed: Mar. 8, 2012

(65) Prior Publication Data

US 2012/0238124 A1    Sep. 20, 2012

Related U.S. Application Data

(60) Provisional application No. 61/465,158, filed on Mar. 15, 2011.

(51) Int. Cl.
*H01R 13/62* (2006.01)

(52) U.S. Cl.
USPC .......................... 439/350; 307/10.1; 439/352

(58) Field of Classification Search
USPC ................................. 439/350, 352; 307/10.1
See application file for complete search history.

(56) References Cited

U.S. PATENT DOCUMENTS

| | | | |
|---|---|---|---|
| 4,345,122 A | 8/1982 | Janniello | |
| 7,084,361 B1 * | 8/2006 | Bowes et al. | 200/16 R |
| 7,402,068 B1 * | 7/2008 | Tarchinski | 439/350 |
| 7,588,461 B2 * | 9/2009 | Tyler | 439/607.41 |
| 7,641,499 B1 * | 1/2010 | George et al. | 439/352 |
| 7,789,690 B1 | 9/2010 | Rhein | |
| 8,043,108 B2 * | 10/2011 | Engbring et al. | 439/352 |
| 8,328,581 B2 * | 12/2012 | de Chazal | 439/620.28 |
| 8,466,586 B2 * | 6/2013 | Tarchinski et al. | 307/328 |

FOREIGN PATENT DOCUMENTS

| | | |
|---|---|---|
| EP | 1 176 676 A2 | 1/2002 |
| EP | 1 401 061 A1 | 3/2004 |

OTHER PUBLICATIONS

International Search Report, International Application No. PCT/US2012/000134, International Filing Date Dec. 3, 2012.

* cited by examiner

*Primary Examiner* — Gary F. Paumen

(57) ABSTRACT

A connector assembly includes an electrical connector having a housing that includes a mating end with an exterior profile being generally D-shaped. The housing has a pair of corners. The electrical connector further includes an insert held within the housing having a mating end. A high voltage interlock (HVIL) conductor is located in at least one of the corners of the housing. The HVIL conductor is configured to be electrically connected to a corresponding HVIL conductor of a second electrical connector when the electrical connector and the second electrical connector are coupled together. An interfacial seal is positioned forward of a locking finger of the electrical connector. The HVIL conductors are either in-line or shunted. The HVIL conductors may extend through the insert.

23 Claims, 14 Drawing Sheets

HIGH VOLTAGE CONNECTOR ASSEMBLY

CROSS REFERENCE TO RELATED APPLICATIONS

This application claims the benefit of U.S. Provisional Application No. 61/465,158 filed Mar. 15, 2011, titled HIGH VOLTAGE CONNECTOR, the subject matter of which is herein incorporated by reference in its entirety.

BACKGROUND OF THE INVENTION

The subject matter herein relates generally to a high voltage connector.

Increased fuel costs and increased efforts at reducing environmental pollution have lead the automotive industry towards electric and hybrid electric vehicles (HEV). One design aspect of these vehicles is the consideration for the high operating voltage. Consequently, specific components of the vehicles must be designed to accommodate the high voltage.

In current automotive industry applications, a high voltage and electrical and magnetic compatible (EMC) shielded connector is needed to provide a stable, sealed mechanical and electrical connection. In some applications a connection is needed between a high voltage plug connector and a header connector mounted to an EMC shielded module. Other applications require an inline high voltage connector. Some known high voltage (HV) devices or connectors have interlock circuits that control when current is transmitted from a high voltage power source to electric loads. The interlock circuits may be used when engaging and disengaging high voltage male and female terminals inside their housings in a high voltage circuit. The interlock circuits ensure that high voltage male and female terminals are engaged prior to transferring the current along or through the high voltage circuit. Additionally, interlock circuits ensure that the high voltage male and female terminals are disengaged after discontinuing the current along or through the high voltage circuit.

For example, some known devices include a first connector, which may be a header connector or an inline connector. The first connector may be directly wired to an interlock circuit within the device. The first connector also may include a male terminal that transfers current through a high voltage circuit. A second mating or plug connector, containing a female terminal, mates with the first connector to electrically couple the high voltage male and female terminals. Meanwhile, a high voltage interlock (HVIL) circuit is electrically connected through low voltage male and female terminals. For example, the plug connector may include a conductive shunt that bridges the male and female terminals of the interlock circuit to close the interlock circuit. The plug connector also includes a high voltage female terminal. Sequentially, the high voltage female terminal mates first with the high voltage male terminal in the first connector to connect the high voltage circuit. The shunt of the plug connector mates second and closes the interlock circuit. This sequence allows the high voltage male and female terminals to mate prior to the interlock circuit closing and the transfer of high voltage current. Likewise, when the connectors are unmated, the reverse sequence is followed. The high voltage female terminal and high voltage male terminal connecting the high voltage circuit unmate before the shunt unmates and opens the interlock circuit. This sequence allows the high voltage male and female terminals to unmate after the interlock circuit is opened so there is no transfer of high voltage current. The purpose of interlock circuit is to avoid arcing during mating/unmating of high voltage female and male terminals.

However, current high voltage connectors have several problems. First, each terminal size requires a unique connector. Current connector housings are sized to accommodate only one size terminal. Also larger terminals may require larger connectors which in turn require more space to accommodate the connector and may be too large for certain applications. Additionally, connectors with shunted interlock circuits require a specific design to accommodate a set mating and unmating sequence. This may not be desirable for all applications. Third, in current designs, if the shunt is inside the connector, then the HVIL circuits are inside of the connector (internal shunt-internal HVIL circuits). Or, if the shunt is outside the connector, the HVIL circuits are outside the connector (external shunt-external HVIL circuits). Fourth, once two connector halves are tooled, the shunt side is determined either at the plug side or the first connector side. So the end user has to accommodate the design of the system to this. Fifth, the end user may prefer an inline interlock circuit instead of a shunt circuit, but current existing connectors do not offer this solution. The current designs are limited with little flexibility.

A need remains for a connector assembly that overcomes these and other problems with conventional connectors.

BRIEF DESCRIPTION OF THE INVENTION

In one embodiment, a connector assembly is provided including an electrical connector having a housing that includes a mating end with an exterior profile being generally D-shaped. The housing has a pair of corners. The electrical connector further includes an insert held within the housing having a mating end. A high voltage interlock (HVIL) conductor is located in at least one of the corners of the housing. The HVIL conductor is configured to be electrically connected to a corresponding HVIL conductor of a second electrical connector when the electrical connector and the second electrical connector are coupled together.

In another embodiment, a connector assembly is provided that includes a plug connector configured to be terminated to a high voltage cable and a mating connector being coupled with the plug connector. The plug connector has a plug housing and a plug insert held within the plug housing. The plug housing has a mating end with an exterior profile being generally D-shaped and having a pair of corners. The mating connector has a mating housing and a mating insert held within the mating housing. The mating housing has a mating end with an exterior profile being generally D-shaped with a pair of corners. The plug and mating connectors have high voltage interlock (HVIL) conductors located in at least one of the corners that are electrically connected together when the plug and mating connectors are coupled together.

Optionally, the exterior profile of the plug housing may be defined by a flat top and a U-shaped bottom meeting at the corners. The exterior profile of the mating housing may be defined by a flat top and U-shaped bottom meeting at the corners. The plug and mating housings may include channels extending axially therethrough. The HVIL conductors may extend through the channels of the plug housing and the mating housing. The plug and mating inserts may include channels extending axially therethrough. The HVIL conductors may extend through the channels of the plug insert and the mating insert.

Optionally, the plug connector may include a plug terminal held by the plug insert that extends along a central longitudinal axis of the plug connector. The corners may be positioned radially further from the longitudinal axis than other portions of the plug housing. The mating connector may include a mating terminal held by the mating insert that extends along a central longitudinal axis of the mating connector. The corners of the mating housing may be positioned radially further from the longitudinal axis than other portions of the mating housing.

Optionally, the HVIL conductors may include a first wire having a first HVIL terminal terminated to the end of the first wire and a second wire having a second HVIL terminal terminated to the end of the second wire. The first wire and the first HVIL terminal may be held by the plug connector and the second wire and the second HVIL terminal may be held by the mating connector. The HVIL conductors may include a HVIL shunt connected between the first and second wires. In a first configuration, the HVIL shunt is held interior of the plug connector. In a second configuration, the HVIL shunt is held interior of the mating connector. In a third configuration, the HVIL shunt may be held exterior of the plug connector.

In another embodiment, a connector assembly is provided that includes a mating connector having a mating housing and a mating insert held within the mating housing. The mating insert holds a mating terminal and has a high voltage interlock (HVIL) conductor. The connector assembly also includes a plug connector mated to the mating connector. The plug connector is configured to be terminated to a high voltage cable and has a HVIL conductor electrically connected to the HVIL conductor of the mating connector when the plug and mating connectors are coupled together. The plug connector includes a plug housing having a chamber therein, a first insert subassembly having a first plug insert holding a first plug terminal, and a second insert subassembly having a second plug insert holding a second plug terminal. Mating ends of the first and second plug terminals have different diameters. The plug housing is sized and shaped to securely receive and retain the first plug insert and the plug housing is sized and shaped to securely receive and retain the second plug insert. The first insert subassembly and the second insert subassembly are alternatively received in the chamber.

In a further embodiment, a connector assembly is provided that includes a mating connector having a mating housing and a mating insert held within the mating housing. The mating housing extends along a longitudinal axis to a mating end at a front of the mating housing. The mating insert holds a mating terminal along the longitudinal axis. The mating housing has a locking finger proximate to the mating end. The mating housing has a seal shroud at the mating end at the front. The seal shroud is positioned axially forward of the locking finger. The mating connector has a high voltage interlock (HVIL) conductor. The connector assembly also includes a plug connector mated to the mating connector. The plug connector is configured to be terminated to a high voltage cable. The plug connector has a HVIL conductor electrically connected to the HVIL conductor of the mating connector when the plug and mating connectors are coupled together. The plug connector includes a plug housing and a plug insert held within the plug housing. The plug housing extends along a longitudinal axis to a mating end at a front of the plug housing. The mating end of the plug housing is coupled to the mating end of the mating housing. The plug insert holds a plug terminal along the longitudinal axis. The plug housing has a locking aperture that receives the locking finger to lock the plug connector to the mating connector, and the locking aperture is proximate to the mating end. The plug housing has a seal well internal of the plug housing. The seal well holds an interfacial seal and the seal well receives the seal shroud of the mating housing with the interfacial seal providing sealing between the mating housing and the plug housing. The seal well is positioned axially rearward of the locking aperture.

DETAILED DESCRIPTION OF THE INVENTION

Embodiments described herein may provide a high voltage connector having a housing with a cavity that accepts different types of inserts. The inserts allow for different terminal sizes. The inserts have a cavity with flexible mounting features to accept different terminal sizes. The same housing can be used to hold the different inserts and terminals reducing the overall part count of the product family.

Embodiments described herein may provide a high voltage connector having a housing with a generally D-shaped outer profile at the mating end thereof for keyed mating with a corresponding D-shaped mating connector. The shape of the connector accommodates HVIL conductors at the corners (e.g. at the corners near the flat part of the D-shaped housing). Placing the HVIL conductors in the wasted space of the corners allows for reduced overall size of the connector.

Embodiments described herein may provide high voltage connectors having flexible HVIL configurations. Some configurations accommodate a shunt type HVIL connection and other configurations accommodate an inline HVIL connection. The housings of the connectors provide features to accommodate the various wiring configurations for the HVIL circuit. Optionally, internal shunt HVIL circuits may be provided. Alternatively, external shunt HVIL circuits may be provided. The shunt can be either at the plug side or the mating connector side.

Embodiments described herein may provide high voltage connectors having a reduced overall size by axially offsetting the locking features and the sealing features rather than radially offsetting the locking features and the sealing features. Optionally, the locking features and/or the sealing features may be contained interior of the connectors, which may reduce the size of the envelope of the connector assembly.

Figure 1:
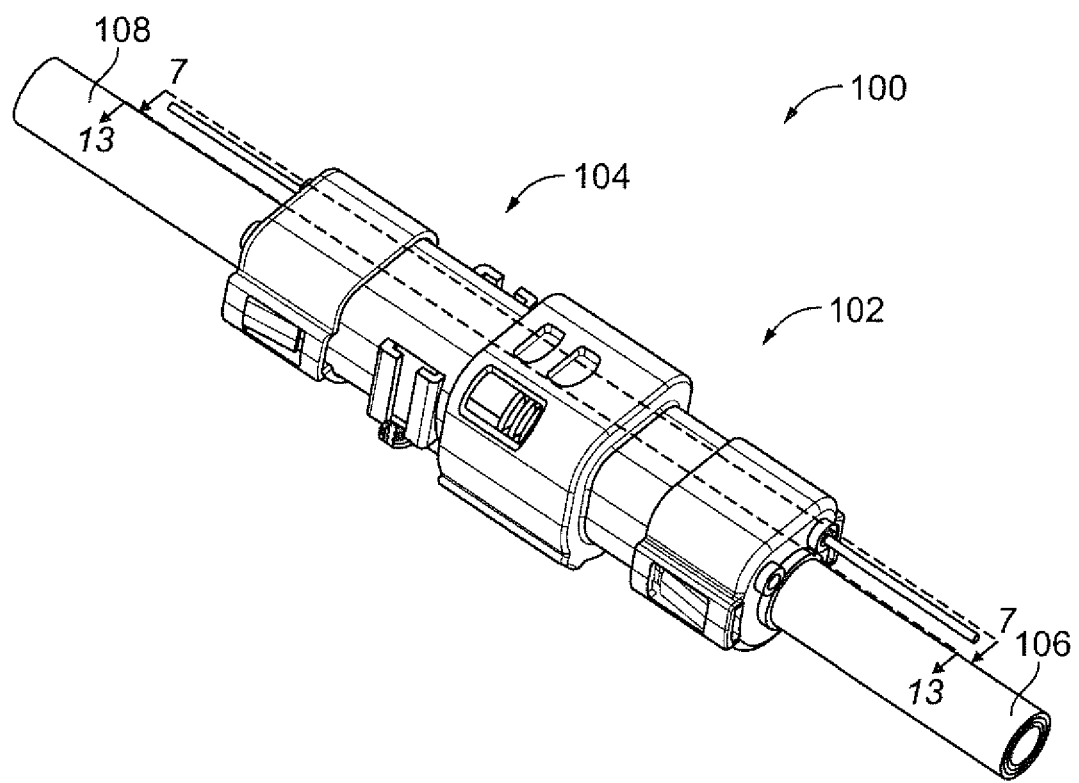
FIG. 1 is a perspective view of a connector assembly formed in accordance with an exemplary embodiment.

FIG. 1 is a perspective view of a connector assembly 100 formed in accordance with an exemplary embodiment. The connector assembly 100 may form part of a high-power electrical system within a vehicle, such as an electric or a hybrid electric vehicle. The connector assembly 100 includes first and second electrical connectors 102, 104 mated together. The first and second electrical connectors 102, 104 are represented in FIG. 1 as a plug connector and a mating connector, and may be referred to hereinafter as a plug connector 102 and a mating connector 104. The mating connector 104 may be referred to as a first electrical connector and the plug connector 102 may be referred to as a second electrical connector. The terms first and second are used interchangeably to refer to the plug and mating connectors. In an exemplary embodiment, the plug connector 102 and the mating connector 104 have an inline configuration where the connectors 102, 104 are arranged inline with corresponding high voltage cables. While an inline configuration is illustrated in FIG. 1, other configurations are possible in alternative embodiments, such as where the mating connector defines a header connector mounted within a component or device, such as a module or other device within an electric or a hybrid electric vehicle.

The plug connector 102 is terminated to an end of a first high voltage cable 106 and the mating connector 104 is terminated to an end of a second high voltage cable 108. The mating connector 104 may include features to permanently secure the mating connector 104 in a stationary position, such as within an electric or a hybrid electric vehicle. The plug connector 102 is configured to be coupled to the mating connector 104.

In an exemplary embodiment, the connector assembly 100 includes latching and/or locking features to secure the plug connector 102 to the mating connector 104. The connector assembly 100 may include keying features to ensure proper orientation between the plug connector 102 and the mating connector 104. The connector assembly 100 may include a connector position assurance (CPA) feature to ensure that the plug connector 102 and the mating connector 104 are properly mated and remain mated together. The connector assembly 100 may include a high voltage interlock (HVIL) circuit that ensures that the main power terminals of the connector assembly 100 are properly and fully electrically connected prior to conveying power along the cables 106, 108 and/or ensures that the electrical connection between the main power terminals of the connector assembly 100 stop conveying power prior to separating. The connector assembly 100 may provide a sealed environment for the main power terminals. The connector assembly 100 may include features that allow the size of the plug and mating connectors 102, 104 to be reduced and/or minimized. The connector assembly 100 may include features that allow different sized power terminals and/or cables 106, 108 to be mated when the plug connector 102 is coupled to the mating connector 104.

Figure 2:
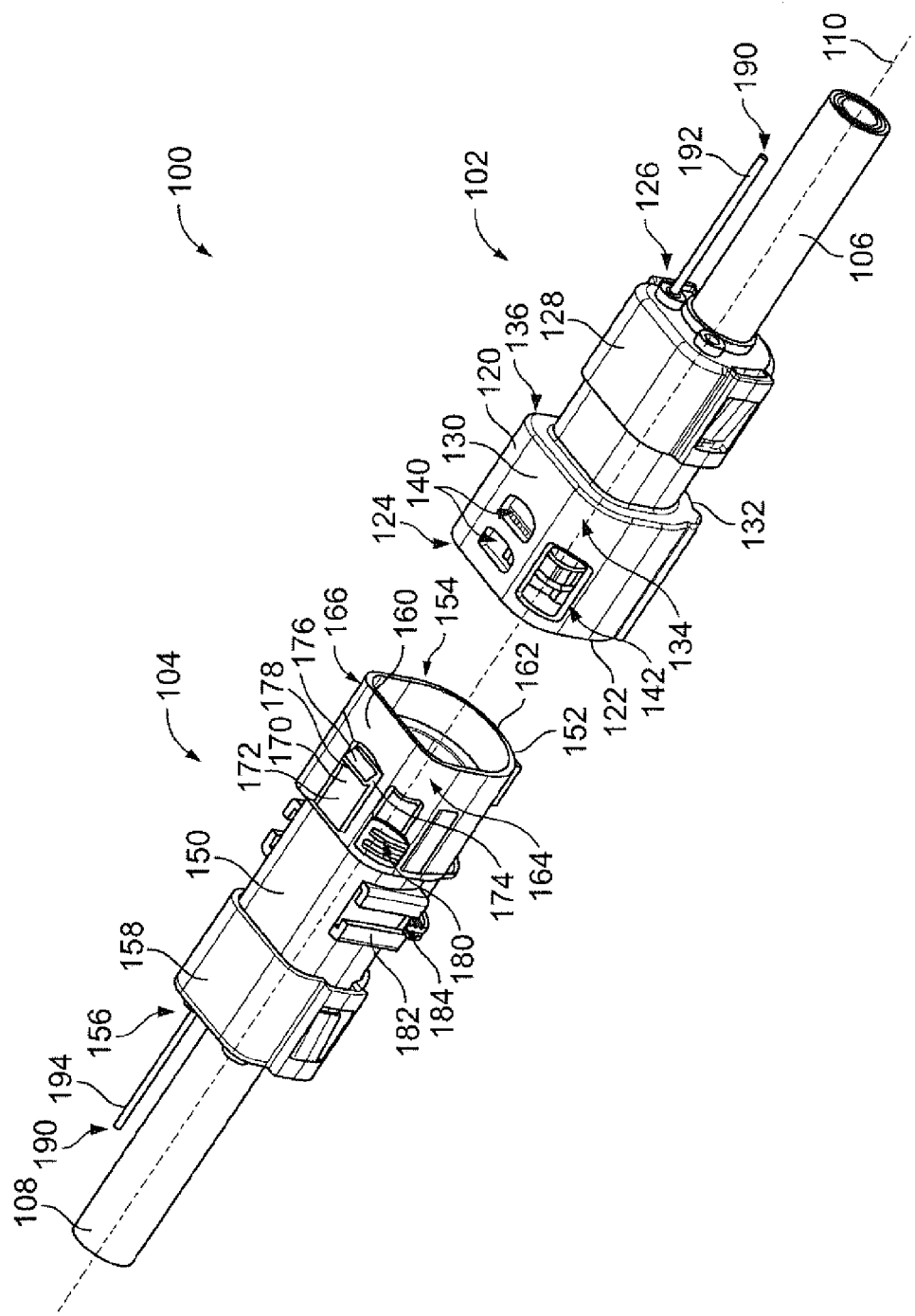
FIG. 2 is a perspective view of the connector assembly shown in FIG. 1 showing a plug connector poised for mating with a mating connector.

FIG. 2 is a perspective view of the connector assembly 100 showing the plug connector 102 poised for mating with the mating connector 104. The plug and mating connectors 102, 104 generally extend along a longitudinal axis 110. The plug connector 102 is coupled to the mating connector 104 along the longitudinal axis 110.

The plug connector 102 includes a plug housing 120. The plug housing 120 extends between a mating end 122 at a front 124 of the plug connector 102 and a terminating end 126 opposite the front 124. In an exemplary embodiment, the plug housing 120 is manufactured from a dielectric material, such as a plastic material. The plug housing 120 may be molded. The high voltage cable 106 extends from the terminating end 126. The mating end 122 is configured to be mated with the mating connector 104. A cable retainer 128 is provided at the terminating end 126. The cable retainer 128 provides strain relief for the high voltage cable 106.

In an exemplary embodiment, the plug housing 120 has an exterior profile that is generally D-shaped having a flat top 130 and a generally U-shaped bottom 132. Corners 134, 136 are generally defined at the intersection between the top 130 and the bottom 132. Optionally, the corners 134, 136 may be curved. Alternatively, the corners 134, 136 may be squared and meet at a right angle.

The plug housing 120 includes locking features to secure the plug connector 102 to the mating connector 104. In the illustrated embodiment, the locking features are defined by locking apertures 140 extending through the top 130. Other types of locking features may be used in alternative embodiments. Optionally, multiple locking apertures 140 may be provided to allow staged mating of the plug connector 102 with the mating connector 104. For example, the plug connector 102 may be partially mated using the forward-most locking aperture 140 or the plug connector 102 may be fully mated using the rearward-most locking aperture 140. The locking apertures 140 are positioned proximate to the front 124.

In an exemplary embodiment, the plug housing 120 includes an opening 142 that provides access to a connector position assurance (CPA) device 180. In the illustrated embodiment, the opening 142 is positioned proximate to the front 124 at the corner 134. The opening 142 may be provided at other locations in alternative embodiments. The opening 142 is elongated axially to allow the CPA device 180 to slide axially, as described in further detail below.

The mating connector 104 includes a mating housing 150. The mating housing 150 extends between a mating end 152 at a front 154 of the mating connector 104 and a terminating end 156 opposite the front 154. In an exemplary embodiment, the mating housing 150 is manufactured from a dielectric material, such as a plastic material. The mating housing 150 may be molded. The high voltage cable 106 extends from the terminating end 156. The mating end 152 is configured to be mated with the plug connector 102. A cable retainer 158 is provided at the terminating end 156. The cable retainer 158 provides strain relief for the high voltage cable 106.

In an exemplary embodiment, the mating housing 150 has an exterior profile that is generally D-shaped having a flat top 160 and a generally U-shaped bottom 162. Corners 164, 166 are generally defined at the intersection between the top 160 and the bottom 162. Optionally, the corners 164, 166 may be curved. Alternatively, the corners 164, 166 may be squared and meet at a right angle.

The mating housing 150 includes locking features to secure the mating connector 104 to the plug connector 102. In the illustrated embodiment, the locking features are defined by a locking finger 170 configured to be received in the locking apertures 140 of the plug housing 120 to secure the plug connector 102 to the mating connector 104. The locking finger 170 is deflectable. The locking finger 170 includes an arm 172 and a protrusion 174 extending from the arm 172. The arm 172 is cantilevered and is configured to be deflected or pressed inward to release the locking finger 170 from the locking aperture 140. In an exemplary embodiment, the protrusion 174 is provided at or proximate to the distal end of the arm 172. The protrusion 174 includes a ramp surface 176 that is forward facing and a locking wall 178 that is rearward facing. The locking wall 178 is configured to engage the plug housing 120 when the protrusion 174 is located in the locking aperture 140. During mating, the ramp surface 176 rides along the plug housing 120 forcing the locking finger 170 to deflect inward until the protrusion 174 is aligned with the locking aperture 140. The protrusion 174 falls into the locking aperture 140 so that the locking wall 178 locks with the locking aperture 140. The protrusion 174 locking at the forward-most locking aperture 140 is correlated with the HVIL circuit being disengaged, thereby having the main electrical power discontinued along cable 106 and/or 108. When the protrusion 174 is in the forward-most locking aperture 140, the power terminals inside the mating and plug connectors 104 and 102 are engaged. The protrusion 174 locking at the rearward-most locking aperture 140 is correlated with the HVIL circuit being completely engaged and main electrical power is transmitted between the cables 106, 108. At the same time, the power terminals inside connectors 104, 102 are engaged further.

The mating connector 104 includes a CPA device 180. The CPA device 180 ensures that the plug connector 102 and mating connector 104 are fully mated. The CPA device 180 further locks the connectors 102, 104 together. The CPA device 180 provides a visual indication that the connectors 102, 104 are mated together. In the illustrated embodiment, the CPA device 180 is slidably coupled to the mating housing 150. A portion of the CPA device 180 is positioned below or radially inward of the locking finger 170. The CPA device 180 is movable between a prelock position and a locked position. In the prelock position, the CPA device 180 is slid or positioned in a rearward position such that the CPA device 180 does not block the inward deflection of the locking finger 170. In the locked position, the CPA device 180 is slid forward until the CPA device 180 is generally aligned with the arm 172, such as proximate to the distal end of the arm 172. The CPA device 180 blocks deflection of the locking finger 170 in the locked position, thus providing a secondary lock for the connector assembly 100. Other types of CPA devices 180 may be used in alternative embodiments.

In an exemplary embodiment, the mating housing 150 includes mounting features for mounting the mating connector 104 in a stationary position within the vehicle. For example, the mating housing 150 may include one or more clips 182 for mounting the mating connector 104. The mating connector 104 may include fasteners, such as threaded fasteners 184, for securing the mating housing 150 to a chassis or other support structure of the vehicle. Other types of mounting features may be used in alternative embodiments.

In an exemplary embodiment, the connector assembly 100 includes a high voltage interlock (HVIL) circuit 190. The HVIL circuit 190 includes a first wire 192 and a second wire 194. The HVIL circuit 190 may include additional wires in alternative embodiments. In the illustrated embodiment, the HVIL circuit 190 is in an inline configuration having a single wire to single wire pass through provided by the housings 120, 150. The first wire 192 is associated with the plug connector 102 and extends along the first high voltage cable 106. The second wire 194 is associated with the mating connector 104 and extends along the second high voltage cable 108. The first and second wires 192, 194 may be routed along the cables 106, 108 for the entire lengths of the cables 106, 108. Alternatively, the first and second wires 192, 194 may be routed away from the cables 106, 108 and connectors 102, 104 to other portions of the vehicle.

The HVIL circuit 190 includes a first HVIL terminal 196 (shown in FIG. 7) terminated to the end of the first wire 192 and a second HVIL terminal 198 terminated to the end of the second wire 194. The terminals 196, 198 and wires 192, 194 define HVIL conductors, generally referred to at 199. When the plug connector 102 is mated with the mating connector 104, the first and second HVIL terminals 196, 198 are coupled together to complete the HVIL circuit 190. In an exemplary embodiment, the HVIL wires 192, 194 and corresponding terminals 196, 198 are routed through the connectors 102, 104 in the corners 136, 166. The components of the HVIL circuit 190 may be routed in the corners 134, 164 in addition to, or in the alternative to, the routing of the HVIL components in the corners 136, 166. The corners 136, 134, 164, 166 are spare spaces and are used for the HVIL components. Thus, incorporating the HVIL circuit 190 does not enlarge the connectors 102, 104. The D-shaped plug and mating housings 120, 150 provides orientation between housings 120, 150. The D-shaped plug and mating housings 120, 150 provide the corners as extra space for routing of the component of the HVIL circuit 190.

Figure 3:
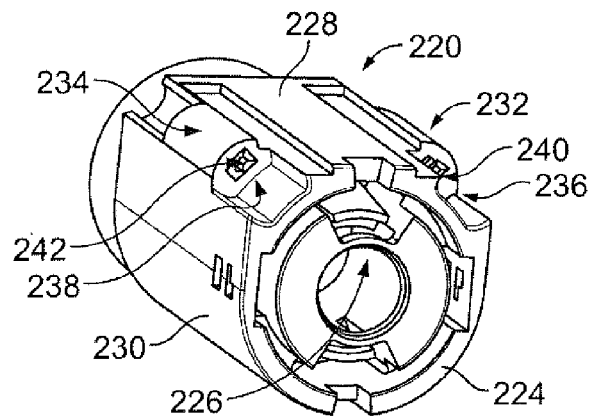
FIG. 3 is a front perspective view of a plug insert for the plug connector shown in FIG. 2 and formed in accordance with an exemplary embodiment.
Figure 4:
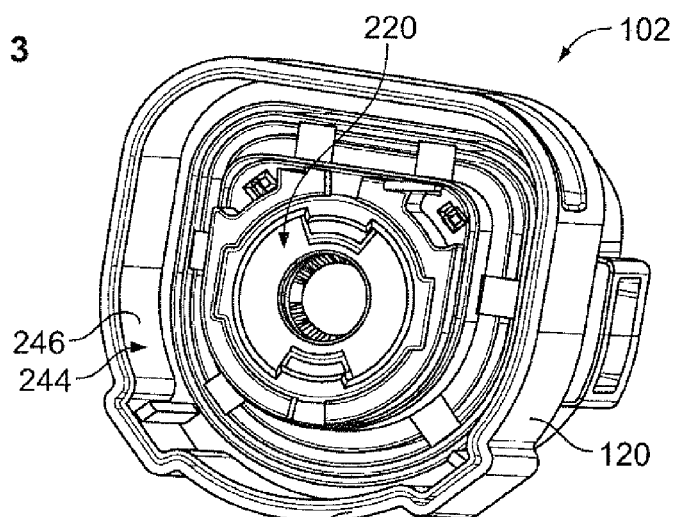
FIG. 4 is a front perspective view of the plug connector shown in FIG. 2.

FIG. 3 is a front perspective view of a plug insert 220 formed in accordance with an exemplary embodiment. FIG. 4 is a front perspective view of the plug connector 102 showing the plug insert 220 received in the plug housing 120. The plug insert 220 is configured to hold a plug terminal 222 (shown in FIG. 7).

The plug insert 220 has a mating end 224 and an opening 226 extending axially through the plug insert 220 that receives the plug terminal 222. In an exemplary embodiment, the plug insert 220 is manufactured from a dielectric material, such as a plastic material. The plug insert 220 may be molded. The plug insert 220 has an exterior profile that is generally D-shaped at the mating end 224. The exterior profile has a flat top 228 and a generally U-shaped bottom 230. Corners 232, 234 are generally defined at the intersection between the top 228 and the bottom 230.

In an exemplary embodiment, the plug insert 220 includes grooves 236, 238 extending rearward from the mating end 224. The grooves 236, 238 are located at the corners 232, 234, respectively. In an exemplary embodiment, HVIL channels 240, 242 are formed in the corners 232, 234. The HVIL channels 240, 242 open to the grooves 236, 238. The HVIL channels 240, 242 are configured to receive components of the HVIL circuit 190 (shown in FIG. 2). The corners 232, 234 are spare spaces and are used for the HVIL components. Incorporating the HVIL components in the corners 232, 234 does not enlarge the height or width of the plug insert 220, and thus does not detrimentally impact the exterior profile of the plug insert 220. The corners 232, 234 provide extra space for routing the components of the HVIL circuit 190.

As shown in FIG. 4, when the plug connector 102 is assembled, the plug insert 220 is loaded into a chamber 244 of the plug housing 120. The plug housing 120 entirely peripherally surrounds the plug insert 220. The plug insert 220 is sized and shaped to fit and be secured within the chamber 244. In an exemplary embodiment, the plug housing 120 has a shroud 246 at the mating end 122. The shroud 246 encloses or surrounds a space that receives the mating connector 104 (shown in FIG. 2).

Figure 5:
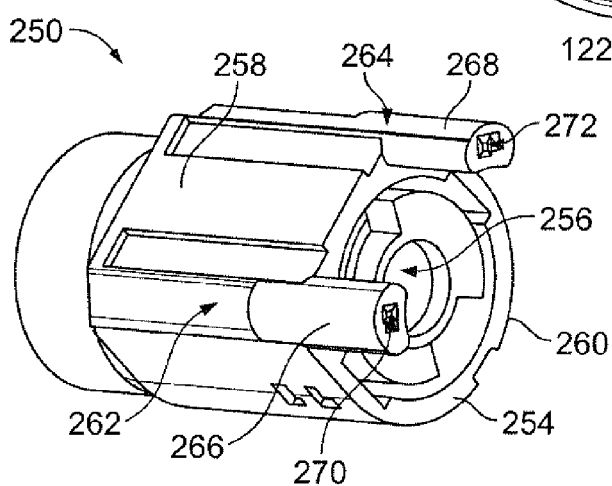
FIG. 5 is a front perspective view of a mating insert for the mating connector shown in FIG. 2 and formed in accordance with an exemplary embodiment.
Figure 6:
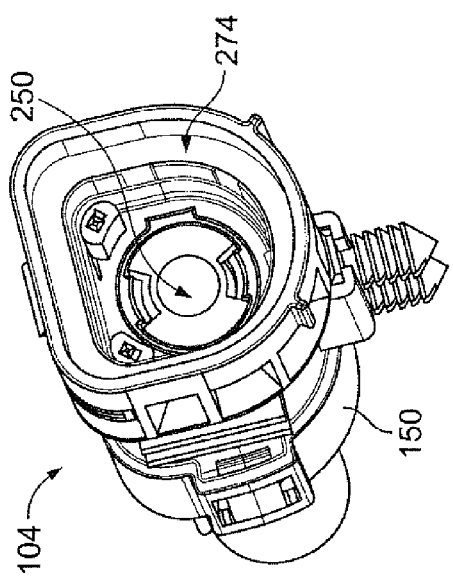
FIG. 6 is a front perspective view of the mating connector shown in FIG. 2.

FIG. 5 is a front perspective view of a mating insert 250 formed in accordance with an exemplary embodiment. FIG. 6 is a front perspective view of the mating connector 104 showing the mating insert 250 received in the mating housing 150. The mating insert 250 is configured to hold a mating terminal 252 (shown in FIG. 7).

The mating insert 250 has a mating end 254 and an opening 256 extending axially through the mating insert 250 that receives the mating terminal 252. In an exemplary embodiment, the mating insert 250 is manufactured from a dielectric material, such as a plastic material. The mating insert 250 may be molded. The mating insert 250 has an exterior profile that is generally D-shaped at the mating end 254. The exterior profile has a flat top 258 and a generally U-shaped bottom 260. Corners 262, 264 are generally defined at the intersection between the top 258 and the bottom 260.

In an exemplary embodiment, the mating insert 250 includes extensions 266, 268 extending forward from the mating end 254. The extensions 266, 268 are located at the corners 262, 264, respectively. In an exemplary embodiment, HVIL channels 270, 272 extend through the extensions 266, 268 and/or the corners 262, 264. The HVIL channels 270, 272 are configured to receive components of the HVIL circuit 190 (shown in FIG. 2). The corners 262, 264 are spare spaces and are used for the HVIL components. Incorporating the HVIL components in the corners 262, 264 does not enlarge the height or width of the mating insert 250, and thus does not detrimentally impact the exterior profile of the mating insert 250. The corners 262, 264 provide extra space for routing the components of the HVIL circuit 190.

As shown in FIG. 6, when the mating connector 104 is assembled, the mating insert 250 is loaded into a chamber 274 of the mating housing 150. The mating housing 150 entirely peripherally surrounds the mating insert 250. The mating insert 250 is sized and shaped to fit and be secured within the chamber 274.

Figure 7:
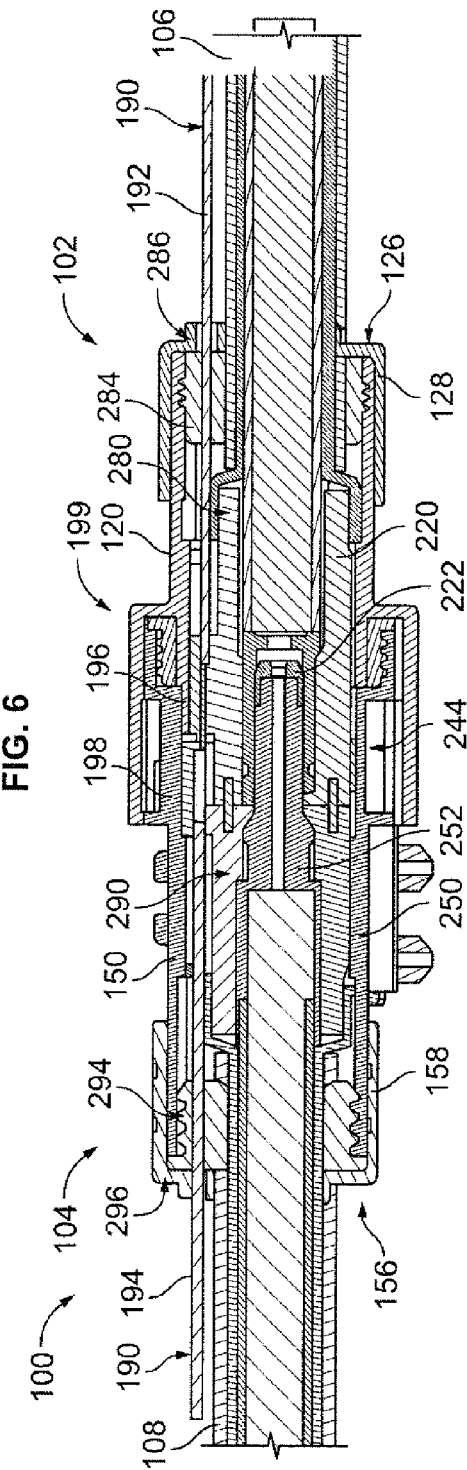
FIG. 7 is a cross-sectional view of the connector assembly taken along line 7-7 shown in FIG. 1 showing the plug connector mated with the mating connector.

FIG. 7 is a cross-sectional view of the connector assembly 100 showing the plug connector 102 mated with the mating connector 104. FIG. 7 illustrates components of the HVIL circuit 190 in an in-line configuration.

Figure 8:
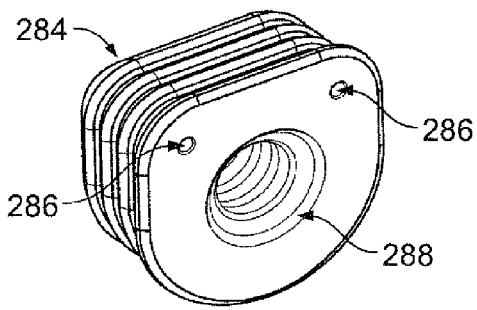
FIG. 8 illustrates a grommet for the plug connector.

When assembled, the plug terminal 222 is loaded into the plug insert 220. The plug terminal 222 and plug insert 220 together define a plug insert subassembly 280. The plug terminal 222 is terminated to the end of the high voltage cable 106. The plug insert subassembly 280 is loaded into the plug housing 120. A grommet 284 is provided at the terminating end 126, and is illustrated in FIG. 8. The grommet 284 seals the entry of the high voltage cable 106. The cable retainer 128 is coupled to the plug housing 120. The cable retainer 128 holds the grommet 284 in the plug housing 120.

In an exemplary embodiment, the grommet 284 includes at least one grommet opening 286 that receives the wire 192 of the HVIL circuit 190. The wire 192 extends into the interior chamber 244 of the plug housing 120. The wire 192 extends through the cable retainer 128 and the grommet 284 into the HVIL channel 240 (shown in FIG. 3). The HVIL terminal 196 is terminated to the end of the wire 192. The HVIL terminal 196 extends through the HVIL channel 240 into the groove 236 (shown in FIG. 3). Optionally, the HVIL terminal 196 may be secured within the HVIL channel 240, such as by an interference fit or by using a barb, tine or finger to hold the HVIL terminal 196 in position.

When assembled, the mating terminal 252 is loaded into the mating insert 250. The mating terminal 252 and mating insert 250 together define a mating insert subassembly 290. The mating terminal 252 is terminated to the end of the high voltage cable 108. The mating insert subassembly 290 is loaded into the mating housing 150. A grommet 294 is provided at the terminating end 156. The grommet may be similar to, or identical to, the grommet 284. The grommet 294 seals the entry of the high voltage cable 108. The cable retainer 158 is coupled to the mating housing 150. The cable retainer 158 holds the grommet 294 in the mating housing 150.

In an exemplary embodiment, the grommet 294 includes at least one grommet opening 296 that receives the wire 194 of the HVIL circuit 190. The wire 194 extends into the interior chamber 274 of the mating housing 150. The wire 194 extends through the cable retainer 158 and the grommet 294 into the HVIL channel 270 (shown in FIG. 5). The HVIL terminal 198 is terminated to the end of the wire 194. The HVIL terminal 198 extends through the HVIL channel 270 and the extension 266 (shown in FIG. 5). Optionally, the HVIL terminal 198 may be secured within the HVIL channel 270, such as by an interference fit or by using a barb, tine or finger to hold the HVIL terminal 198 in position. The HVIL terminal 196 is mated to the HVIL terminal 198 when the plug connector 102 is mated with the mating connector 104.

FIG. 8 illustrates the grommet 284. The grommet 284 includes a cable channel 288 that receives the first high voltage cable 106. The grommet 284 is generally D-shaped with the grommet openings 286 in the corners of the grommet 284.

Figure 9:
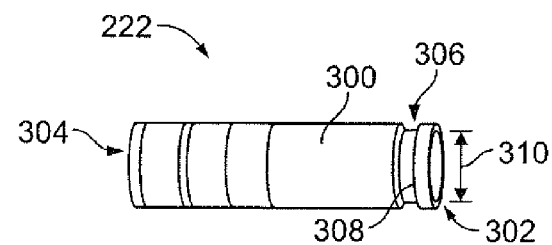
FIG. 9 illustrates a plug terminal for the plug connector in accordance with an exemplary embodiment.

FIG. 9 illustrates the plug terminal 222. The plug terminal 222 has a conductive body 300 extending between a mating end 302 and a terminating end 304. The terminating end 304 is terminated to the first high voltage cable 106. Optionally, the terminating end 304 may be crimped to the cable 106. The terminating end 304 may be terminated by other means or processes in alternative embodiments.

In the illustrated embodiment, the mating end 302 defines a socket or female terminal. The plug terminal 222 includes a groove 306 proximate to the mating end 302. The groove 306 is defined by a shoulder 308. The groove 306 and shoulder 308 are used to secure the plug terminal 222 in the plug insert 220 (shown in FIG. 3), as described in further detail below. The body 300 has a diameter 310 at the mating end 302. The diameter 310 defines the particular type of plug terminal 222.

Optionally, the connector assembly 100 (shown in FIG. 1) may accommodate different types of plug terminals having different diameters, as described in further detail below.

Figure 10:
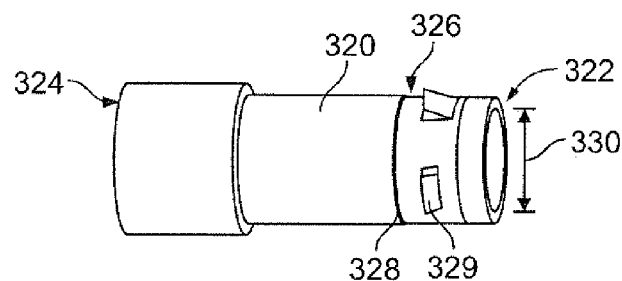
FIG. 10 illustrates a plug terminal for the plug connector in accordance with an exemplary embodiment.

FIG. 10 illustrates a plug terminal 222'. The plug terminal 222' is similar to the plug terminal 222 (shown in FIG. 9). The plug terminal 222' is of a different type than the plug terminal 222. The plug terminal 222' has a larger diameter than the plug terminal 222. For example, the plug terminal 222' may have an inner diameter (inside the socket) of approximately 11.3 mm while the plug terminal 222 may have an inner diameter of approximately 8.3 mm. Plug terminals having other diameters may be provided in other embodiments.

The plug terminal 222' has a conductive body 320 extending between a mating end 322 and a terminating end 324. The terminating end 324 is terminated to the first high voltage cable 106. Optionally, the terminating end 324 may be crimped to the cable 106. The terminating end 324 may be terminated by other means or processes in alternative embodiments.

In the illustrated embodiment, the mating end 322 defines a socket or female terminal. The plug terminal 222' includes a groove 326 rearward of the mating end 322. The groove 326 receives a clip 328 that has tanges 329 extending outward therefrom. The tanges 329 are used to secure the plug terminal 222' in the plug insert 220' (shown in FIG. 14), as described in further detail below. The body 320 has a diameter 330 at the mating end 322. The diameter 330 defines the particular type of plug terminal 222'. The diameter 330 is greater than the diameter 310 (shown in FIG. 9).

Figure 11:
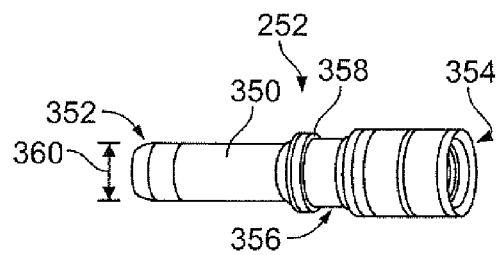
FIG. 11 illustrates a mating terminal for the mating connector in accordance with an exemplary embodiment.

FIG. 11 illustrates the mating terminal 252 in accordance with an exemplary embodiment. The mating terminal 252 has a conductive body 350 extending between a mating end 352 and a terminating end 354. The terminating end 354 is terminated to the second high voltage cable 108. Optionally, the terminating end 354 may be crimped to the cable 108. The terminating end 354 may be terminated by other means or processes in alternative embodiments.

In the illustrated embodiment, the mating end 352 defines a pin or male terminal. The mating terminal 252 includes a groove 356 proximate to the mating end 352. The groove 356 is defined by a shoulder 358. The groove 356 and shoulder 358 are used to secure the mating terminal 252 in the mating insert 250 (shown in FIG. 5), as described in further detail below. The body 350 has a diameter 360 at the mating end 352. The diameter 360 defines the particular type of mating terminal 252. Optionally, the connector assembly 100 (shown in FIG. 1) may accommodate different types of mating terminals having different diameters, as described in further detail below.

Figure 12:
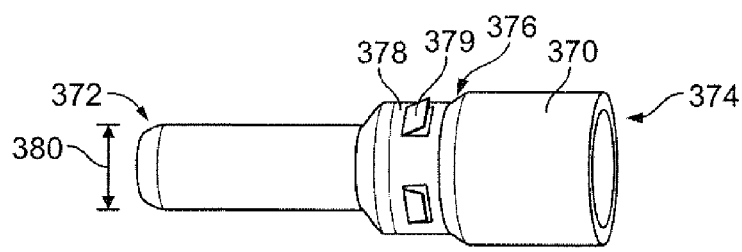
FIG. 12 illustrates a mating terminal for the mating connector in accordance with an exemplary embodiment.

FIG. 12 illustrates a mating terminal 252'. The mating terminal 252' is similar to the mating terminal 252 (shown in FIG. 11). The mating terminal 252' is of a different type than the mating terminal 252. The mating terminal 252' has a larger diameter than the mating terminal 252. For example, the mating terminal 252' may have an outer diameter 380 of approximately 11 mm while the mating terminal 252 may have an outer diameter 360 of approximately 8 mm. Mating terminals having other diameters may be provided in other embodiments.

The mating terminal 252' has a conductive body 370 extending between a mating end 372 and a terminating end 374. The terminating end 374 is terminated to the second high voltage cable 108. Optionally, the terminating end 374 may be crimped to the cable 108. The terminating end 374 may be terminated by other means or processes in alternative embodiments.

In the illustrated embodiment, the mating end 372 defines a pin or male terminal. The mating terminal 252' includes a groove 376 rearward of the mating end 372. The groove 376 receives a clip 378 that has tanges 379 extending outward therefrom. The tanges 379 are used to secure the mating terminal 252' in the mating insert 250' (shown in FIG. 14), as described in further detail below. The body 370 has a diameter 380 at the mating end 372. The diameter 380 defines the particular type of mating terminal 252'. The diameter 380 is greater than the diameter 360 (shown in FIG. 11).

Figure 13:
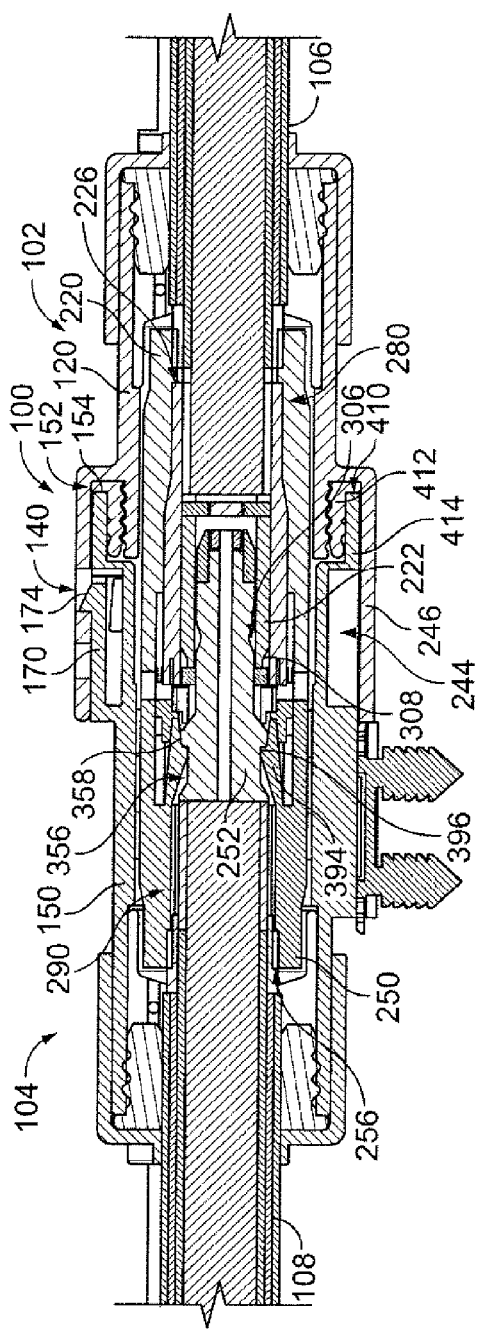
FIG. 13 is a cross-sectional view of the connector assembly taken along line 13-13 shown in FIG. 1.
Figure 14:
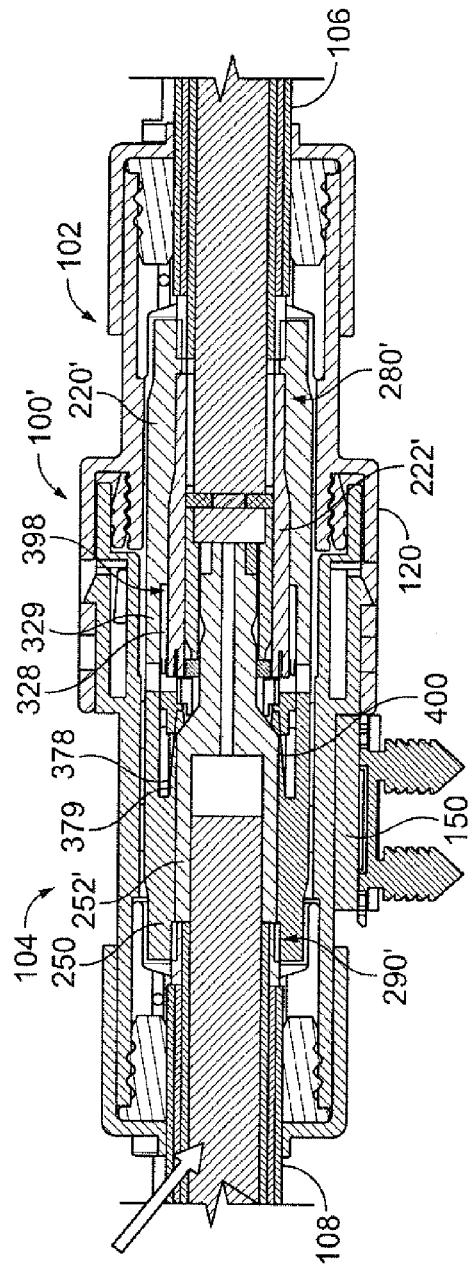
FIG. 14 is another cross-sectional view of the connector assembly.

FIG. 13 is a cross-sectional view of the connector assembly 100 taken along line 13-13 shown in FIG. 1. FIG. 14 is a cross-sectional view of the connector assembly 100 using the plug terminal 222' and the mating terminal 252' taken through the plug terminal 222' and the mating terminal 252'. The embodiments shown in FIGS. 13 and 14 are similar to one another. Both embodiments use the same plug housing 120 and mating housing 150. However, different insert subassemblies are used. For example, in the embodiment of FIG. 13, the plug insert subassembly 280 and the mating insert subassembly 290 are used with the plug terminal 222 and the mating terminal 252. In the embodiment of FIG. 14, insert subassemblies 280', 290' are utilized having a plug insert 220' and a mating insert 250' that are different than the plug insert 220 and the mating insert 250 of the embodiment of FIG. 13. The plug insert 220' is configured to receive the larger plug terminal 222'. The plug insert 220' has the same exterior profile as the plug insert 220 allowing either plug insert 220, 220' to be loaded into the same plug housing 120. The mating insert 250' is configured to receive the larger mating terminal 252'. The mating insert 250' has the same exterior profile as the mating insert 250 allowing either mating insert 250, 250' to be loaded into the same mating housing 150. The plug and mating insert subassemblies 280, 280', 290, 290' may be referred to generically as insert subassemblies and may have designations such as first insert subassembly, second insert subassembly, and the like. The terms first and second may be used interchangeably to refer to either a plug or a mating insert subassembly.

With reference to FIG. 13, the plug insert 220 receives the plug terminal 222 and the cable 106 within the opening 226. The plug insert 220 has a deflectable finger 390 extending into the opening 226. The finger 390 has a protrusion 392 that is received in the groove 306 behind the shoulder 308. The finger 390 and protrusion 392 engage the plug terminal 222 to hold the plug terminal 222 in the plug insert 220. The protrusion 392 resists rearward movement of the plug terminal 222 from the plug insert 220.

The mating insert 250 receives the mating terminal 252 and the cable 108 within the opening 256. The mating insert 250 has a deflectable finger 394 extending into the opening 256. The finger 394 has a protrusion 396 that is received in the groove 356 behind the shoulder 358. The finger 394 and protrusion 396 engage the mating terminal 252 to hold the mating terminal 252 in the mating insert 250. The protrusion 396 resists rearward movement of the mating terminal 252 from the mating insert 250.

With reference to FIG. 14, the plug insert 220' is sized and shaped to receive the larger plug terminal 222'. The plug insert 220' has a locking shoulder 398. The tanges 329 of the clip 328 engages the locking shoulder 398 to hold the plug terminal 222' in the plug insert 220'. The mating insert 250' is sized and shaped to receive the larger mating terminal 252'. The mating insert 250' has a locking shoulder 400. The tanges 379 of the clip 378 engages the locking shoulder 400 to hold the mating terminal 252' in the mating insert 250'.

With reference to FIG. 13, when assembled, the plug connector 102 is locked and sealed to the mating connector 104.

The locking finger 170 is used to secure the plug connector 102 to the mating connector 104. The protrusion 174 of the locking finger 170 is received in the locking aperture 140 of the plug housing 120. The mating end 152 of the mating housing 150 is loaded into the chamber 244 of the plug housing 120. The shroud 246 surrounds the mating housing 150.

In an exemplary embodiment, the plug housing 120 has a seal well 410 within the chamber 244. The seal well 410 holds an interfacial seal 412. The interfacial seal 412 is used to provide a seal between the plug connector 102 and the mating connector 104. The mating housing 150 has a seal shroud 414 at the front 154. The seal shroud 414 is stepped radially outward with respect to rearward portions of the mating housing 150. The seal shroud 414 is received in the seal well 410. The seal shroud 414 engages the interfacial seal 412 to provide sealing between the seal 412 and the mating housing 150.

In an exemplary embodiment, the seal shroud 414 is positioned axially forward of the locking finger 170. By axially offsetting the locking features and the sealing features, rather than radially offsetting the locking features and sealing features (e.g., having the locking finger 170 positioned radially outside of the seal shroud 414), the connector assembly 100 has a reduced overall size. For example, the outer perimeter of the connector assembly 100 is reduced as compared to an embodiment having a locking finger positioned radially outside of a seal shroud.

Figure 15:
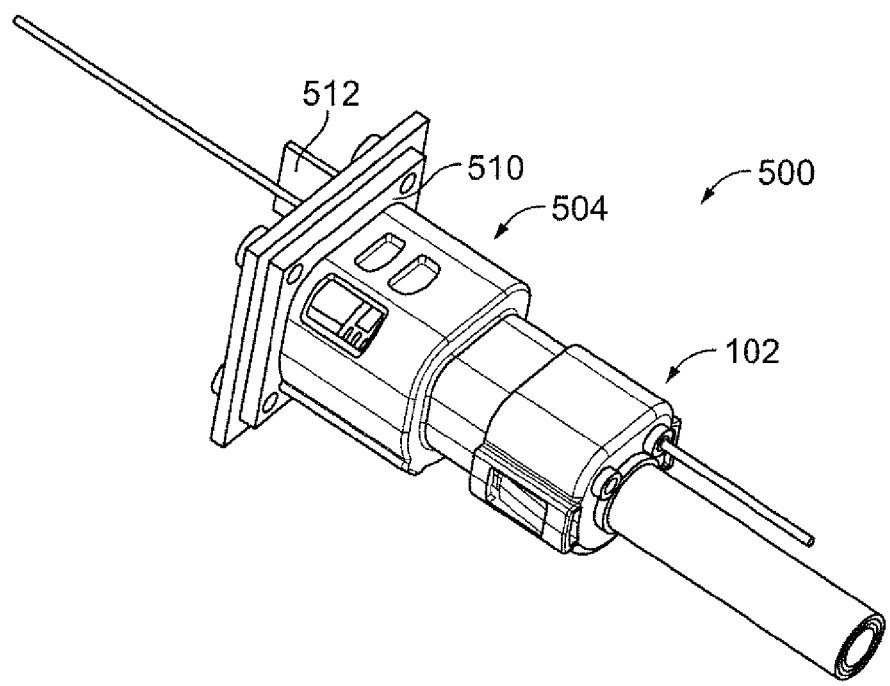
FIG. 15 illustrates a connector assembly formed in accordance with an exemplary embodiment.

FIG. 15 illustrates a connector assembly 500 formed in accordance with an exemplary embodiment. The connector assembly 500 includes the plug connector 102 and a mating connector 504. In an exemplary embodiment, the mating connector 504 has a header configuration that is configured to be mounted in a panel, chassis or other portion of a vehicle or device.

The mating connector 504 has a header housing 510. The plug housing 120 mates to the header housing 510. A mating terminal 512 is received in the header housing 510 for mating with the plug connector 102. FIG. 15 illustrates an in-line HVIL configuration for the HVIL circuit.

Figure 16:
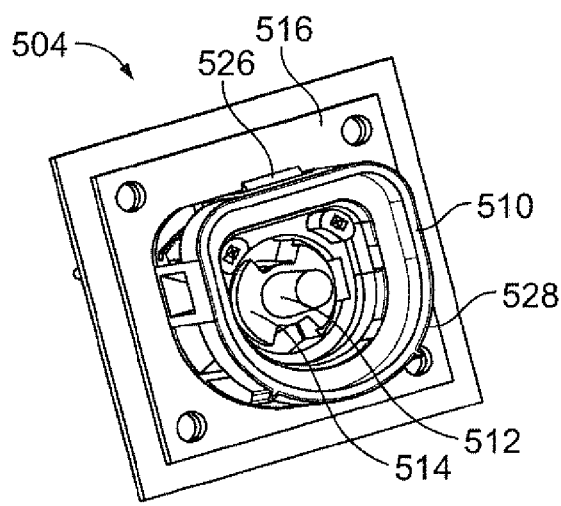
FIG. 16 is a front perspective view of a mating connector for the connector assembly shown in FIG. 15.
Figure 17:
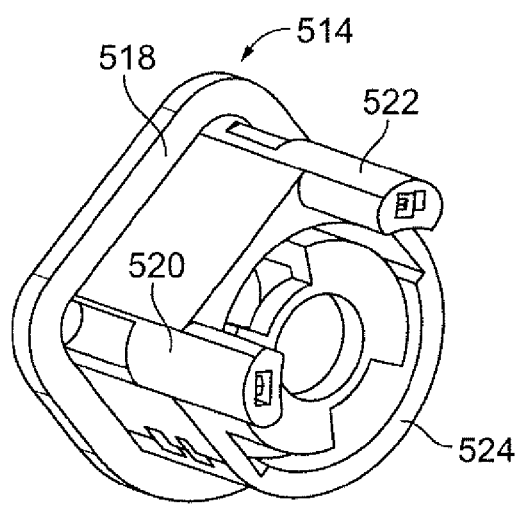
FIG. 17 is a front perspective view of a mating insert for the header connector shown in FIG. 16.

FIG. 16 is a front perspective view of the mating connector 504. FIG. 17 is a front perspective view of a mating insert 514 that holds the mating terminal 512 (shown in FIG. 16). The header housing 510 includes a panel 516 used to mount the mating connector 504 to a panel of a device or chassis. The mating insert 514 includes a flange 518 that engages the panel 516 when loaded into the header housing 510 to position the mating insert 514 in the header housing 510.

The mating insert 514 includes similar features as the mating insert 250 (shown in FIG. 5). The mating insert 514 includes extensions 520, 522 in the corners of the mating insert 514 at a mating end 524 thereof. The extensions 520, 522 have HVIL channels therethrough. The mating end 524 and extensions 520, 522 may have similar sizes and shapes as the mating insert 250 for mating with the plug connector 102.

The header housing 510 includes locking features for securing the plug connector 102 to the mating connector 504. In the illustrated embodiment, the header housing 510 has a locking finger 526, which may be similar to the locking finger 170 (shown in FIG. 2). The header housing 510 includes a seal shroud 528, which may be similar to the seal shroud 414 (shown in FIG. 13) for sealing against the plug connector 102.

In an exemplary embodiment, the header housing 510 is configured to receive different mating inserts, such as mating inserts that hold different sized mating terminals. The same header housing 510 accommodates the different mating inserts. Tooling costs for the product line can be reduced by such a configuration.

Figure 18:
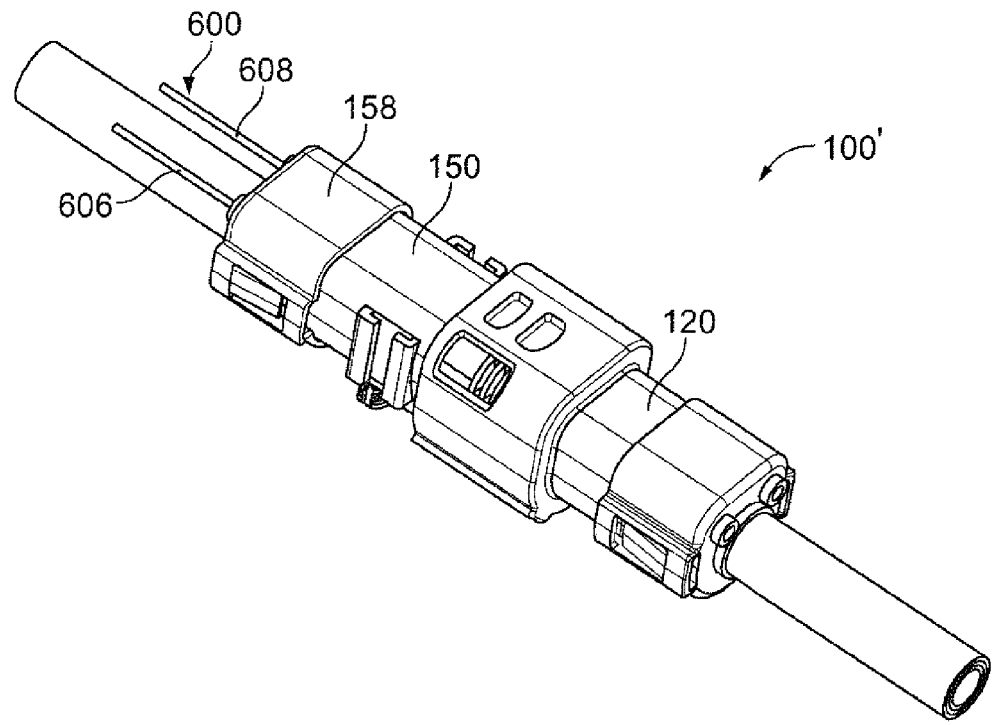
FIG. 18 is a perspective view of the connector assembly shown in FIG. 1 showing an HVIL circuit.
Figure 19:
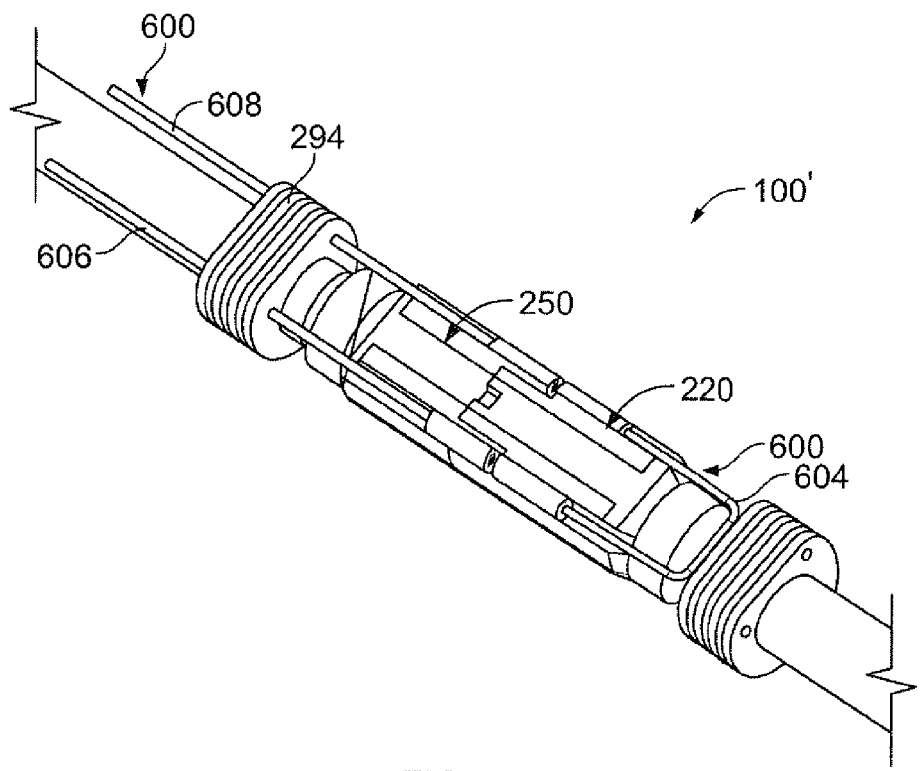
FIG. 19 shows a portion of the connector assembly shown in FIG. 1 showing the HVIL circuit shown in FIG. 18.

FIG. 18 is a perspective view of the connector assembly 100 showing a HVIL circuit 600 having a loop or shunt configuration as opposed to the in-line configuration shown in FIG. 1. The other components (e.g. the housings, inserts, terminals, etc) are the same as or similar to the embodiment shown in FIG. 1, however the HVIL circuit 600 is different. FIG. 19 shows the connector assembly 100 with the plug and mating housings 120, 150 removed for clarity to show the HVIL circuit. The HVIL circuit 600 is shunted and includes a shunt 602. The shunt 602 includes a shunt wire 604 routed within the plug connector 102. First and second wires 606, 608 of the HVIL circuit 600 are routed through the mating connector 104 and extend from the rear of the mating connector 104. The wires 606, 608 extend through openings in the cable retainer 158. The wires 606, 608 are routed through the grommet 294 and the inserts 220, 250.

Figure 20:
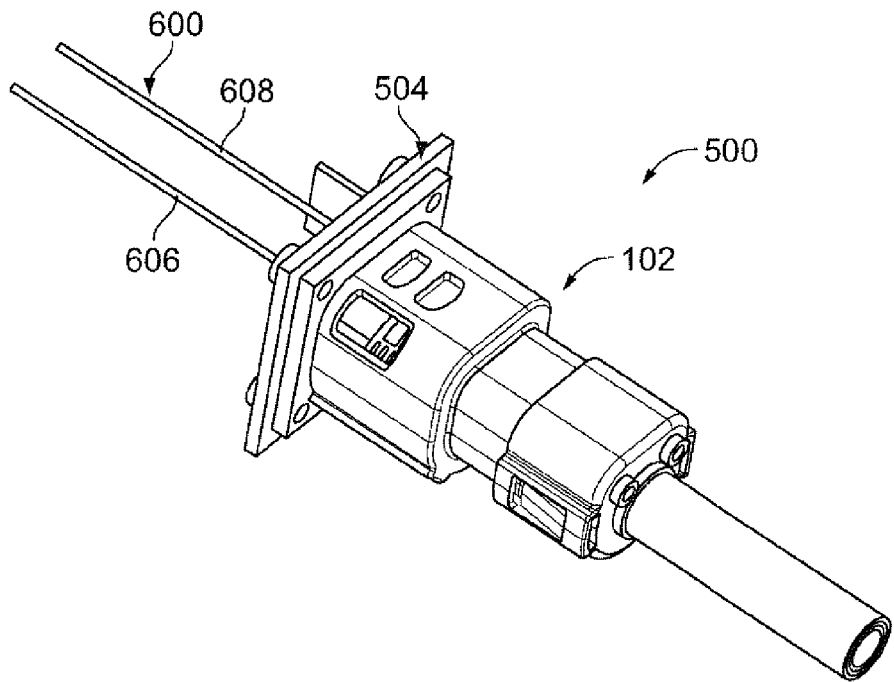
FIG. 20 is a perspective view of the connector assembly shown in FIG. 15 showing an HVIL circuit.

FIG. 20 is a perspective view of the connector assembly 500 (shown in FIG. 15) using the HVIL circuit 600 (shown in FIGS. 18 and 19). The HVIL circuit 600 is used with the mating connector 504 and plug connector 102. The first and second wires 606, 608 of the HVIL circuit 600 are routed through the mating connector 504 and extend from the rear of the mating connector 504.

Figure 21:
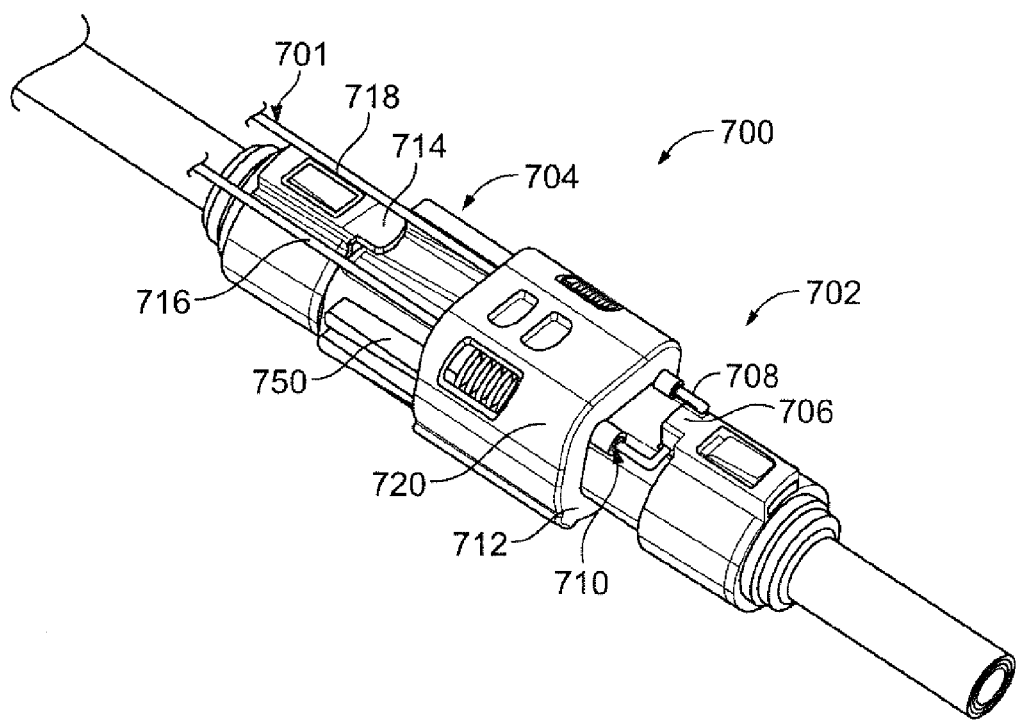
FIG. 21 is a perspective view of a connector assembly formed in accordance with an exemplary embodiment.

FIG. 21 is a perspective view of a connector assembly 700 formed in accordance with an exemplary embodiment. The connector assembly 700 is similar to the connector assembly 100 (shown in FIG. 1), however the connector assembly 700 includes an HVIL circuit 701 that has a loop configuration and that has components that enter and leave the connectors of the connector assembly 700 at different locations than the connector assembly 100. In alternative embodiments, rather than being shunted, the HVIL circuit may be an in-line circuit.

The connector assembly 700 includes a plug connector 702 and a mating connector 704. The plug connector 702 is similar to the plug connector 102 (shown in FIG. 2), however the plug connector 702 includes a tab 706 on an exterior thereof that holds a shunt wire 708 of the HVIL circuit 701. The shunt wire 708 exits and enters a plug housing 720 of the plug connector 702 through openings 710 in a rear facing wall 712 thereof. The shunt wire 708 is routed out of the plug housing 720 such that a portion of the shunt wire is exterior of the plug connector 702. The shunt wire 708 is sealed at the entrance and exit points, such as by using grommets or seals.

The mating connector 704 is similar to the mating connector 104 (shown in FIG. 2), however the mating connector 704 includes a tab 714 on an exterior thereof that is similar to the tab 706. In some embodiments, the shunt wire 708 may be held by the mating connector 704 and secured by the tab 714. First and second HVIL wires 716, 718 of the HVIL circuit 701 exit a mating housing 750 of the mating connector 704 through openings in a rear facing wall thereof. When the mating connector 704 holds the shunt wire 708, the shunt wire 708 may exit and enter the mating housing 750 through such openings.

Figure 22:
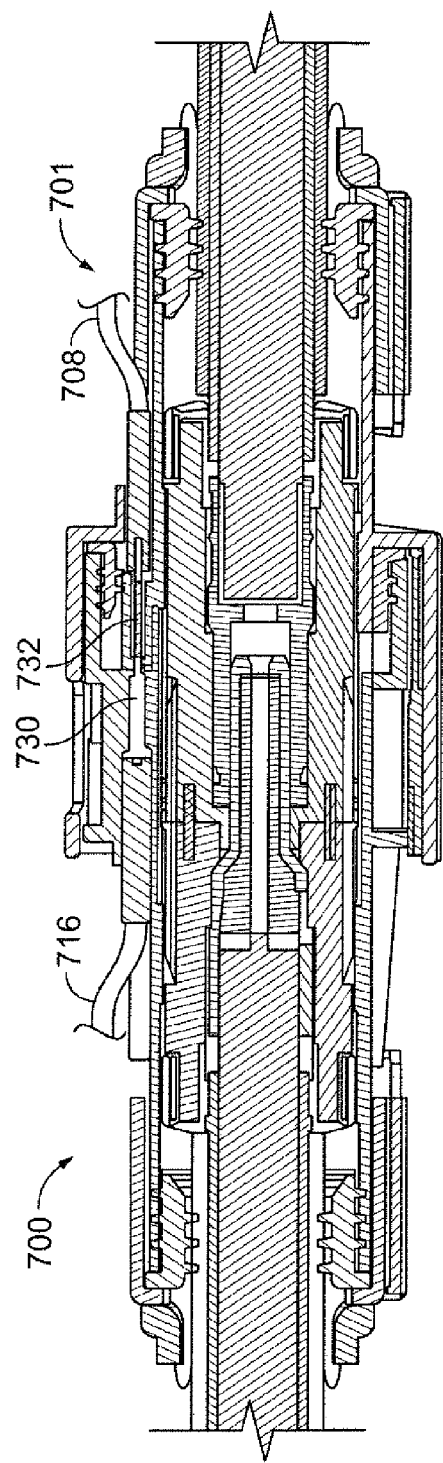
FIG. 22 is a cross sectional view of the connector assembly shown in FIG. 21.

FIG. 22 is a cross sectional view of the connector assembly 700. The HVIL circuit 701 includes a HVIL terminal 730 terminated to the first HVIL wire 716 (a similar HVIL terminal would be terminated to the second HVIL wire 718). The HVIL circuit 701 includes a shunt terminal 732 terminated to one end of the shunt wire 708 (a similar shunt terminal would be terminated to the other end of the shunt wire 708 and mated with the HVIL terminal terminated to the second HVIL wire 718). The shunt terminal 732 is mated with the HVIL terminal 730. The mating between the shunt terminal 732 and the HVIL terminal 730 occurs interior of the housings 720, 750. In the illustrated embodiment, the shunt terminal 732 is a socket terminal and the HVIL terminal is a pin terminal, however the arrangement may be reversed or other types of terminals may be used in alternative embodiments. In an exemplary embodiment, the wires and/or terminals of the HVIL circuit 701 are sealed at the entrance/exit points of the housings 720, 750.

Figure 23:
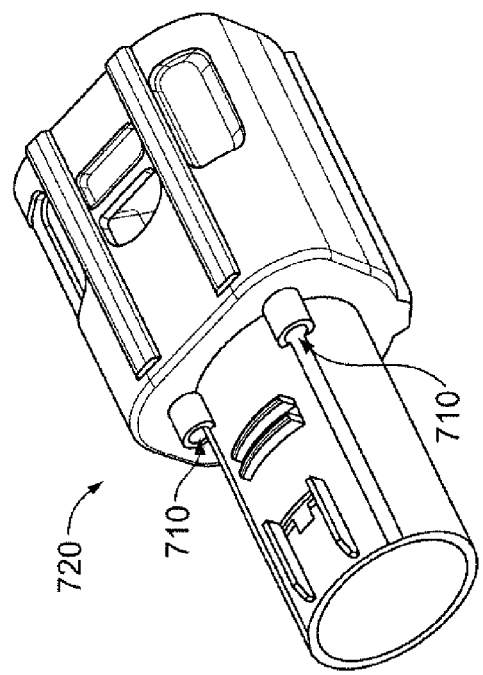
FIG. 23 is a rear perspective view of a plug housing for the connector assembly shown in FIG. 21.
Figure 24:
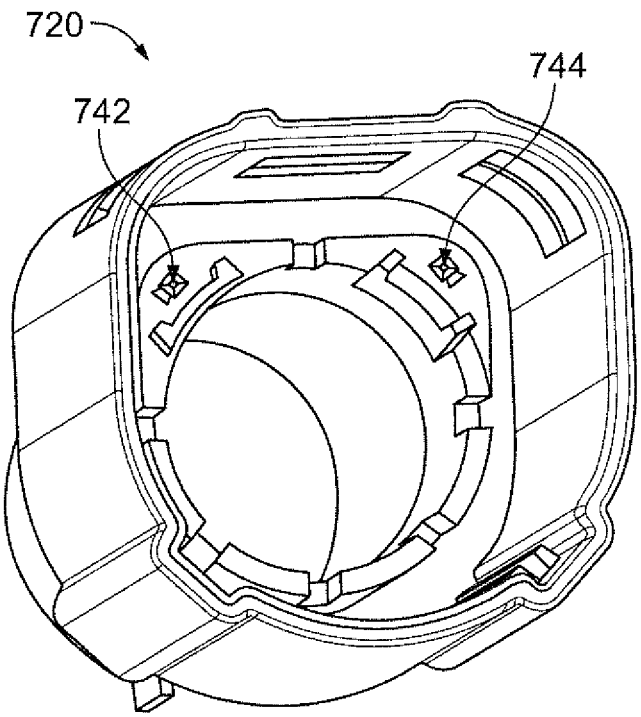
FIG. 24 is a front perspective view of the plug housing for the connector assembly shown in FIG. 21.
Figure 25:
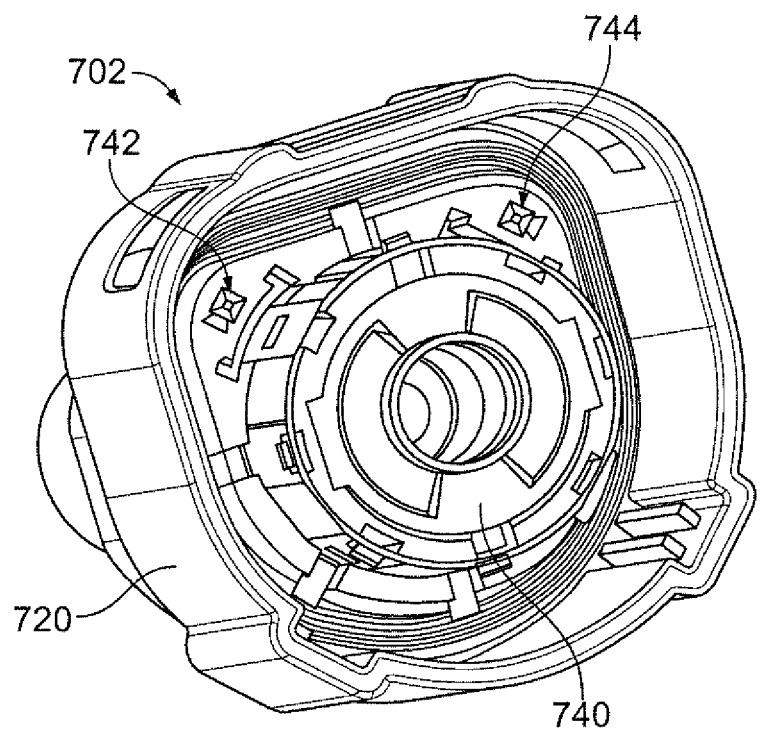
FIG. 25 is a front perspective view of a plug connector for the connector assembly shown in FIG. 21 with a plug insert loaded into the plug housing shown in FIGS. 23-24.

FIG. 23 is a rear perspective view of the plug housing 720. FIG. 24 is a front perspective view of the plug housing 720. FIG. 25 is a front perspective view of the plug connector 702 with a plug insert 740 loaded into the plug housing 720. Optionally, different types of plug inserts may be loaded into the plug housing 720 to define different plug connectors. For example, plug inserts holding different sized or shaped terminals may be loaded into the same plug housing 720.

The plug housing 720 is D-shaped. The plug housing 720 includes the openings 710 extending therethrough. The openings 710 provide access to HVIL channels 742, 744 of the housing 720 that receive the shunt wire 708 and shunt terminals 732 (shown in FIG. 22).

Figure 26:
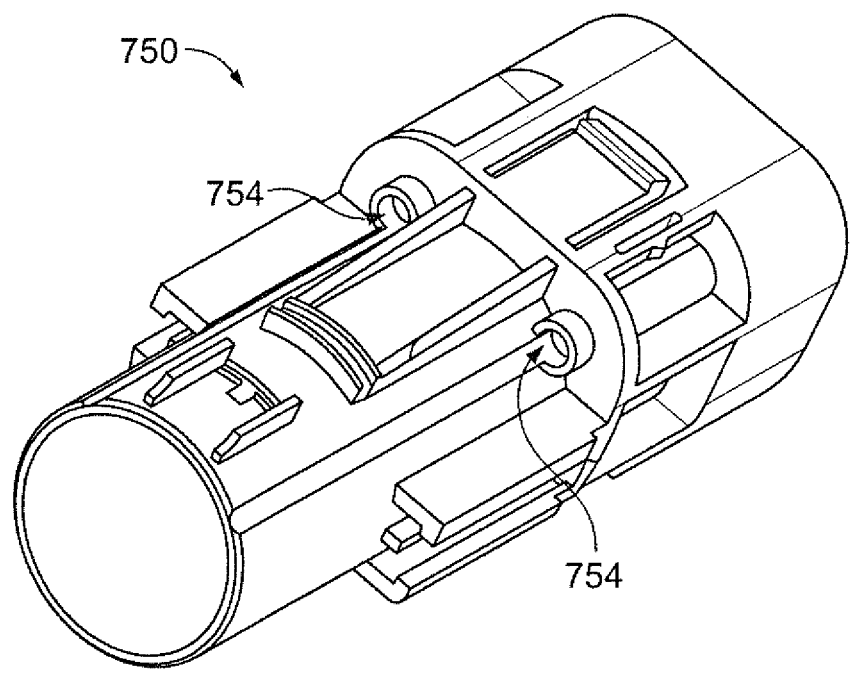
FIG. 26 is a rear perspective view of a mating housing for the connector assembly shown in FIG. 21.
Figure 27:
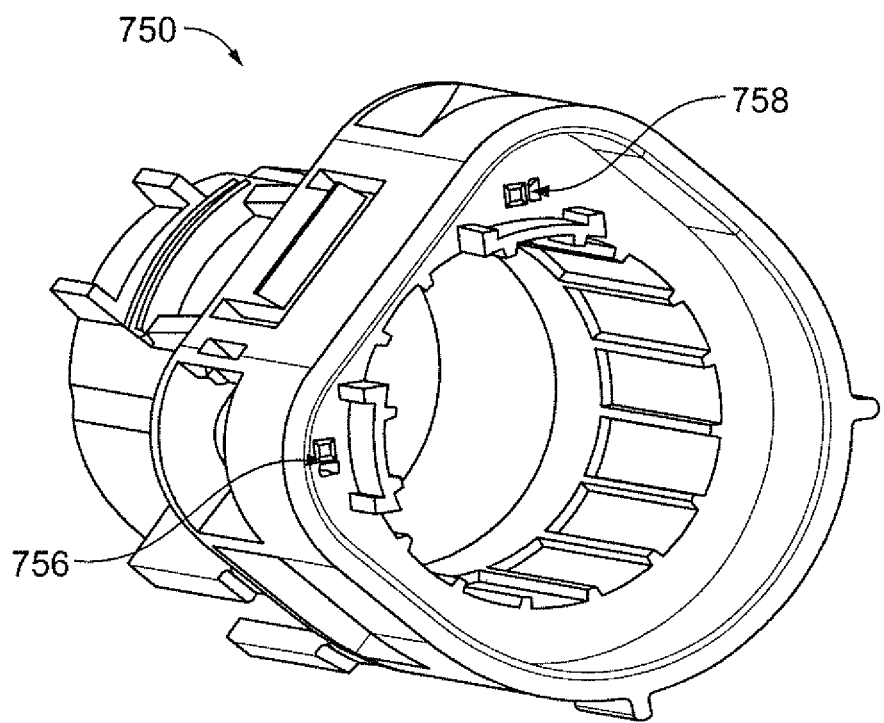
FIG. 27 is a front perspective view of the mating housing shown in FIG. 26.
Figure 28:
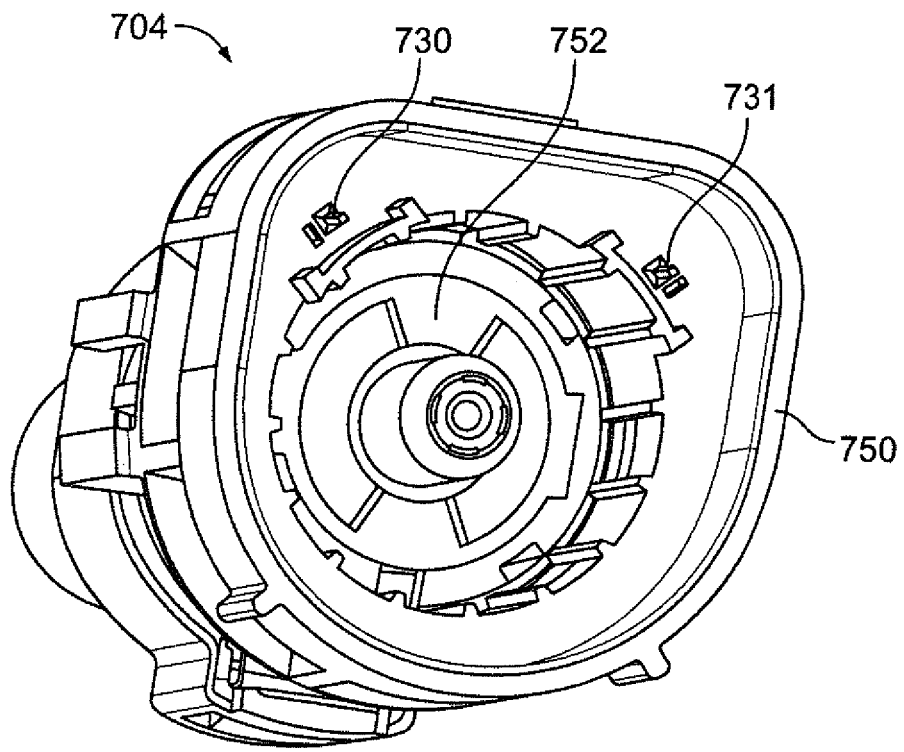
FIG. 28 is a front perspective view of a mating connector for the connector assembly shown in FIG. 21 with a mating insert loaded into the mating housing shown in FIGS. 26-27.

FIG. 26 is a rear perspective view of the mating housing 750. FIG. 27 is a front perspective view of the mating housing 750. FIG. 28 is a front perspective view of the mating connector 704 with a mating insert 752 loaded into the mating housing 750. Optionally, different types of mating inserts may be loaded into the mating housing 750 to define different mating connectors. For example, mating inserts holding different sized or shaped terminals may be loaded into the same mating housing 750.

The mating housing 750 is D-shaped. The mating housing 750 includes openings 754 extending therethrough. The openings 754 provide access to HVIL channels 756, 758 of the housing 750 that receive HVIL wires 716, 718 and HVIL terminals 730, 731.

Figure 29:
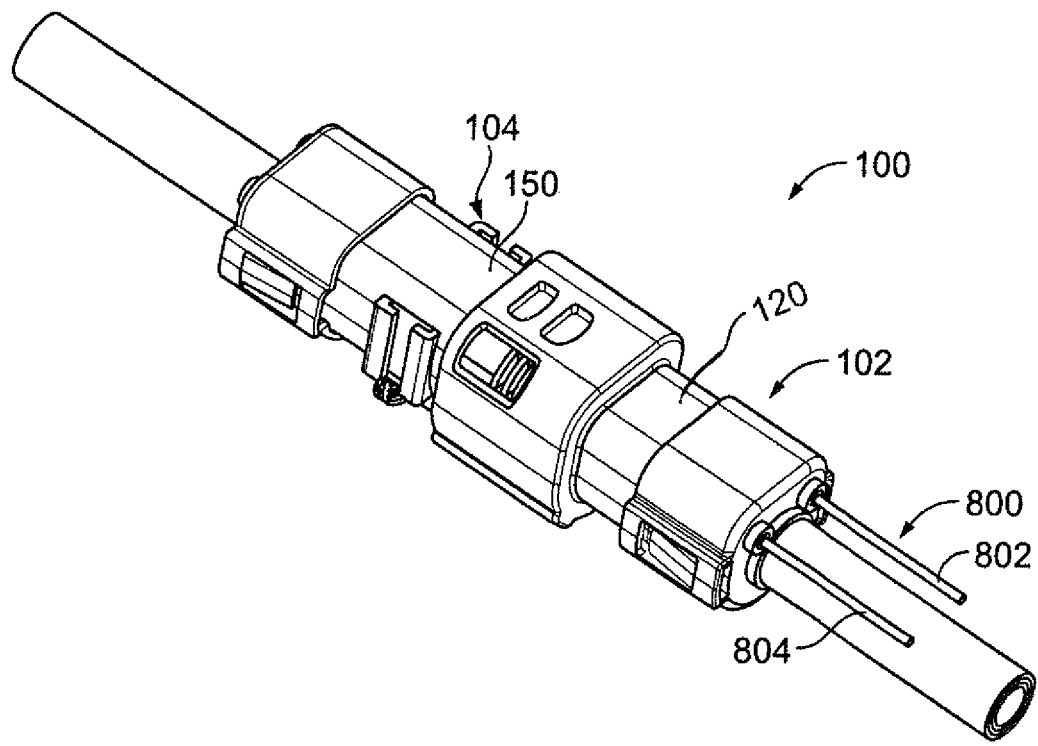
FIG. 29 illustrates the connector assembly shown in FIG. 1 with an HVIL circuit.

FIG. 29 illustrates the connector assembly 100 with an HVIL circuit 800. The connector assembly 100 is the same as the connector assembly 100 shown in FIG. 1, however the HVIL circuit 800 is different than the HVIL circuit of FIG. 1. The HVIL circuit 800 is a loop or shunt configuration having a shunt in the mating connector 104, rather than an in-line configuration. In contrast to the HVIL circuit 600 (shown in FIGS. 18 and 19), the shunt of the HVIL circuit 800 is routed internal of the mating housing 150 as opposed to internal of the plug housing 120. First and second HVIL wires 802, 804 extend rearward from the plug connector 102.

Figure 30:
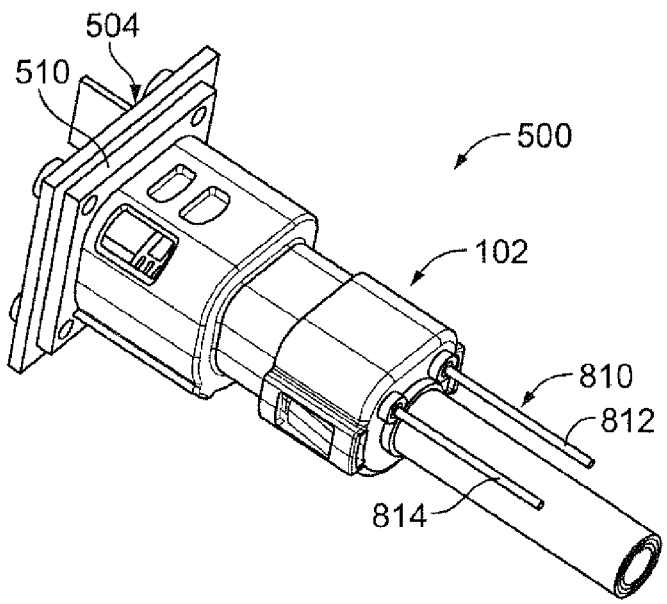
FIG. 30 illustrates the connector assembly shown in FIG. 15 with an HVIL circuit.

FIG. 30 illustrates the connector assembly 500 similar to the embodiment of FIG. 15, with an HVIL circuit 810. The HVIL circuit 810 is a loop or shunt configuration having a shunt in the mating connector 504, as opposed to the in-line configuration of the embodiment of FIG. 15. The shunt is routed internal of the header housing 510. First and second HVIL wires 812, 814 extend rearward from the plug connector 102.

Figure 31:
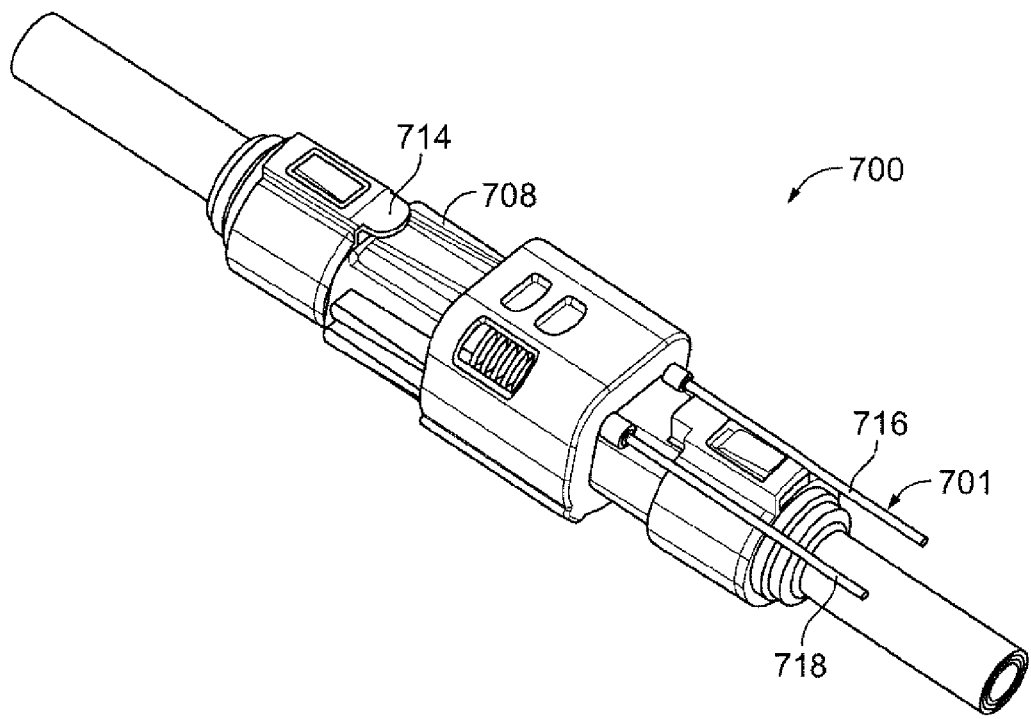
FIG. 31 illustrates the connector assembly shown in FIG. 21 with an HVIL circuit.

FIG. 31 illustrates the connector assembly 700 with the HVIL circuit 701 in a loop or shunt configuration that is reversed as compared to the embodiment of FIG. 21. The shunt wire 708 is held by the mating connector 704, as opposed to the plug connector 702 as with the embodiment of FIG. 21. The shunt wire 708 is secured by the tab 714. The HVIL first and second HVIL wires 716, 718 are held by the plug connector 702. The first and second HVIL wires 716, 718 extend from the openings 710 in the plug housing 720.

Components described herein are generally identified with modifiers such as "plug" or "mating", such as the plug housing and the mating housing, the plug insert or the mating insert, the plug terminal or the mating terminal, however such components may more generally be referred to without the modifiers, such as housing, insert, terminal, and the like. Such components may be identified with modifiers first, second, third, fourth, and the like and are not intended to refer specifically to components of the plug connector or the mating connector. For example, the claims may refer to a housing, which may constitute the plug housing, the mating housing or the housing of another type of connector. The claims may similarly refer to a first housing and a second housing, which may constitute the plug housing and the mating housing, respectively, or alternatively, may constitute the mating housing and the plug housing, respectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
an electrical connector comprising a housing having a mating end with an exterior profile being generally D-shaped, the housing having a pair of corners, the electrical connector further comprising an insert held within the housing, the insert having a mating end; and
a high voltage interlock (HVIL) conductor routed through at least one of the corners of the housing, the HVIL conductor being configured to be electrically connected to a corresponding HVIL conductor of a second electrical connector when the electrical connector and the second electrical connector are coupled together.

2. The connector assembly of claim 1, wherein the exterior profile of the housing is defined by a flat top and a U-shaped bottom meeting at the corners, the housing having channels extending axially through the corners, the HVIL conductor extending through a corresponding one of the channels of the housing.

3. The connector assembly of claim 1, wherein the mating end of the insert has an exterior profile being generally D-shaped, the insert includes channels extending axially through the corners of the insert, the HVIL conductor extending through a corresponding one of the channels of the insert.

4. The connector assembly of claim 1, wherein the housing has a chamber therein, the insert holding a terminal, the insert and the terminal define an insert subassembly, the insert subassembly being received in the chamber, the insert having a finger to retain the terminal in the insert.

5. The connector assembly of claim 1, wherein the housing has a chamber therein, the insert holding a terminal, the insert and the terminal define an insert subassembly, the insert subassembly being received in the chamber, the terminal having a locking tang engaging a locking shoulder of the insert to retain the terminal in the insert.

6. The connector assembly of claim 1, wherein the connector includes a grommet for sealing a terminating end of the housing, the terminating end being opposite the mating end, the grommet being generally D-shaped and having a pair of corners, the grommet having at least one opening at a corresponding corner, the HVIL conductor being routed through the corresponding corner of the grommet.

7. The connector assembly of claim 1, wherein the housing includes a locking aperture configured to receive a locking finger of the second electrical connector to lock the electrical connector to the second electrical connector, the locking aperture being proximate to the mating end of the housing, the housing having a seal well internal of the housing, the seal well holding an interfacial seal, the seal well being configured to receive a seal shroud of the second electrical connector with the interfacial seal providing sealing between the housing and the second electrical connector, the seal well being positioned axially rearward of the locking aperture.

8. The connector assembly of claim 1, wherein the housing includes a locking finger proximate to the mating end, the locking finger configured to be received in a locking aperture of the second electrical connector to lock the electrical connector to the second electrical connector, the housing having a seal shroud at a front of the housing, the seal shroud being positioned axially forward of the locking finger, the seal shroud being configured to be received in a seal well of the second electrical connector to engage an interfacial seal held therein.

9. The connector assembly of claim 1, wherein the housing includes a locking finger proximate to the mating end, the locking finger configured to be received in a locking aperture of the second electrical connector to lock the electrical connector to the second electrical connector, the electrical connector further comprising a connector position assurance device blocking the locking finger from deflecting after the locking finger is received in the locking aperture.

10. The connector assembly of claim 1, further comprising a terminal held by the insert and extending along a central longitudinal axis of the connector, the corners being positioned radially further from the longitudinal axis than other portions of the housing.

11. The connector assembly of claim 1, wherein the HVIL conductor comprises a first wire having a first HVIL terminal terminated to the end of the first wire, the first wire and the first HVIL terminal being routed through at least one of the housing and the insert.

12. The connector assembly of claim 1, wherein the HVIL conductor comprises a first wire having a first HVIL terminal terminated to the end of the first wire and a second wire having a second HVIL terminal terminated to the end of the second wire, the first wire and the first HVIL terminal being routed through at least one of the housing and the insert, the second wire and the second HVIL terminal being routed through at least one of the housing and the insert.

13. The connector assembly of claim 1, wherein the HVIL conductor comprises an HVIL shunt having first and second shunt terminals and a shunt wire extending therebetween, the first and second shunt terminals and the shunt wire being held by at least one of the housing and the insert.

14. A connector assembly comprising:
an electrical connector configured to be mated to a second electrical connector, the electrical connector comprising:
a housing having a chamber therein;
a first insert subassembly having a first insert holding a first terminal, the first terminal having a mating end; and
a second insert subassembly having a second insert holding a second terminal, the second terminal having a mating end;
wherein the mating ends of the first and second terminals have different diameters; and
wherein the housing is sized and shaped to securely receive and retain the first insert and wherein the housing is sized and shaped to securely receive and retain the second insert, the first insert subassembly and the second insert subassembly being alternatively received in the chamber; and
a high voltage interlock (HVIL) conductor coupled to at least one of the housing, the first insert and the second insert, the HVIL conductor being configured to be electrically connected to a corresponding HVIL conductor of the second electrical connector when the electrical connector is mated to the second electrical connector.

15. The connector assembly of claim 14, wherein either the first insert subassembly or the second insert subassembly is received in the chamber at a given time depending on the diameter of the terminal required.

16. The connector assembly of claim 14, wherein the first terminal has a smaller diameter than the second terminal, the first insert having a finger to retain the first terminal in the first insert, the second terminal having a locking tine engaging a locking shoulder of the second insert to retain the second terminal in the second insert.

17. The connector assembly of claim 14, wherein an exterior of the first insert is identical to an exterior of the second insert.

18. The connector assembly of claim 14, wherein the first and second inserts include channels extending therethrough, the HVIL conductor being configured to be held in one of the channels of the first insert or second insert.

19. A connector assembly comprising:
a mating connector having a mating housing and a mating insert held within the mating housing, the mating housing extending along a longitudinal axis to a mating end at a front of the mating housing, the mating insert holding a mating terminal along the longitudinal axis, the mating housing having a locking finger proximate to the mating end, the mating housing having a seal shroud at the mating end at the front, the seal shroud being positioned axially forward of the locking finger, the mating connector having a high voltage interlock (HVIL) conductor; and
a plug connector mated to the mating connector, the plug connector configured to be terminated to a high voltage cable, the plug connector having a HVIL conductor electrically connected to the HVIL conductor of the mating connector when the plug and mating connectors are coupled together, the plug connector comprising a plug housing and a plug insert held within the plug housing, the plug housing extending along a longitudinal axis to a mating end at a front of the plug housing, the mating end of the plug housing being coupled to the mating end of the mating housing, the plug insert holding a plug terminal along the longitudinal axis, the plug housing having a locking aperture that receives the locking finger to lock the plug connector to the mating connector, the locking aperture being proximate to the mating end, the plug housing having a seal well internal of the plug housing, the seal well holding an interfacial seal, the seal well receiving the seal shroud of the mating housing with the interfacial seal providing sealing between the mating housing and the plug housing, the seal well being positioned axially rearward of the locking aperture.

20. The connector assembly of claim 19, wherein the plug housing includes a chamber, the plug insert being positioned in the chamber, the chamber receiving the mating end of the mating housing, the locking finger and the seal shroud being contained within an interior of the chamber.

21. The connector assembly of claim 19, wherein the mating connector comprises a contact position assurance device blocking the locking finger from deflecting after the locking finger is received in the locking aperture.

22. The connector assembly of claim 19, wherein the mating ends of the mating housing and plug housing are generally D-shaped.

23. The connector assembly of claim 19, wherein the plug housing includes a chamber, the HVIL conductors being positioned interior of the chamber.

* * * * *